(12) United States Patent
Sugawara et al.

(10) Patent No.: US 8,295,032 B2
(45) Date of Patent: Oct. 23, 2012

(54) SOLID ELECTROLYTIC CAPACITOR AND MANUFACTURING METHOD THEREOF

(75) Inventors: Yasuhisa Sugawara, Sendai (JP); Masako Ohya, Sendai (JP); Kazuyuki Katoh, Sendai (JP)

(73) Assignee: NEC Tokin Corporation, Sendai (JP)

( * ) Notice: Subject to any disclaimer, the term of this patent is extended or adjusted under 35 U.S.C. 154(b) by 612 days.

(21) Appl. No.: 12/292,485

(22) Filed: Nov. 20, 2008

(65) Prior Publication Data
US 2009/0147446 A1 Jun. 11, 2009

(30) Foreign Application Priority Data
Dec. 5, 2007 (JP) ................................. 2007-314338

(51) Int. Cl.
*H01G 9/02* (2006.01)
*C23C 28/00* (2006.01)

(52) U.S. Cl. ........ 361/525; 361/523; 361/528; 361/529; 29/25.03

(58) Field of Classification Search ................... 361/523, 361/525, 528, 529; 29/25.03; 205/199
See application file for complete search history.

(56) References Cited

U.S. PATENT DOCUMENTS

| | | | | | |
|---|---|---|---|---|---|
| 3,293,507 | A | * | 12/1966 | Smith | 361/518 |
| 3,427,132 | A | * | 2/1969 | Goon | 423/409 |
| 3,466,508 | A | * | 9/1969 | Booe | 361/536 |
| 3,723,838 | A | * | 3/1973 | Kumagai | 361/322 |
| 3,828,227 | A | * | 8/1974 | Millard et al. | 361/540 |
| 3,970,903 | A | * | 7/1976 | Shirn | 361/533 |
| 4,090,288 | A | * | 5/1978 | Thompson et al. | 29/25.03 |
| 4,203,194 | A | * | 5/1980 | McGrath | 29/25.03 |
| 4,423,004 | A | * | 12/1983 | Ross | 29/25.03 |
| 4,544,403 | A | * | 10/1985 | Schiele et al. | 420/427 |
| 4,571,664 | A | * | 2/1986 | Hyland | 361/540 |
| 4,660,127 | A | * | 4/1987 | Gunter | 361/540 |
| 4,791,532 | A | * | 12/1988 | Gouvernelle et al. | 361/529 |
| 5,130,886 | A | | 7/1992 | Kishimoto et al. | |
| 5,410,445 | A | * | 4/1995 | Kanetake | 361/539 |
| 6,238,444 | B1 | * | 5/2001 | Cadwallader | 29/25.03 |
| 6,319,292 | B1 | * | 11/2001 | Pozdeev-Freeman et al. | 29/25.03 |
| 6,432,161 | B1 | * | 8/2002 | Oda et al. | 75/363 |
| 6,679,934 | B2 | * | 1/2004 | Rao et al. | 75/245 |
| 6,786,951 | B2 | * | 9/2004 | He et al. | 75/365 |

(Continued)

FOREIGN PATENT DOCUMENTS

CN 1992110 A 7/2007

(Continued)

OTHER PUBLICATIONS

Office Action issued in Chinese Application No. CN 200810177111.4 dated Dec. 6, 2010 (with translation).

*Primary Examiner* — Anatoly Vortman
(74) *Attorney, Agent, or Firm* — Oliff & Berridge, PLC

(57) ABSTRACT

The present invention provides a solid electrolytic capacitor having sufficiently low impedance at high frequencies in which a conductive polymer formed on a dielectric oxide film has good adherence to the dielectric oxide film, and a manufacturing method of the solid electrolytic capacitor. The solid electrolytic capacitor of the present invention includes a valve metal; a dielectric oxide film layer formed on a surface of the valve metal; and a solid electrolyte layer, comprising a conductive polymer layer, formed on the dielectric oxide film layer. The conductive polymer layer contains, as an additive, 0.1 wt % to 30 wt % of an organic oligomer having an average degree of polymerization of 2 to 100.

6 Claims, 1 Drawing Sheet

U.S. PATENT DOCUMENTS

| | | | |
|---|---|---|---|
| 6,960,237 B2* | 11/2005 | Naito | 75/255 |
| 6,970,345 B2* | 11/2005 | Oh et al. | 361/540 |
| 7,066,975 B2* | 6/2006 | Oda et al. | 75/244 |
| 7,443,653 B2* | 10/2008 | Kim et al. | 361/523 |
| 7,473,294 B2* | 1/2009 | Oda et al. | 75/244 |
| 7,479,166 B2* | 1/2009 | Ito | 29/25.03 |
| 7,570,480 B2* | 8/2009 | Kim et al. | 361/540 |
| 7,666,247 B2* | 2/2010 | He et al. | 75/252 |
| 7,727,508 B2* | 6/2010 | Shi et al. | 423/594.17 |
| 2002/0088507 A1* | 7/2002 | Rao et al. | 148/422 |
| 2002/0104404 A1* | 8/2002 | Naito | 75/245 |
| 2003/0218858 A1* | 11/2003 | Kim et al. | 361/523 |
| 2004/0066607 A1* | 4/2004 | Edson et al. | 361/528 |
| 2005/0088805 A1* | 4/2005 | Edson et al. | 361/529 |
| 2006/0260109 A1* | 11/2006 | Vaisman et al. | 29/25.41 |
| 2006/0262489 A1* | 11/2006 | Vaisman et al. | 361/540 |
| 2006/0275204 A1* | 12/2006 | Tagusagawa et al. | 423/594.17 |
| 2007/0068341 A1* | 3/2007 | Cheng et al. | 75/255 |
| 2007/0171597 A1* | 7/2007 | Merker et al. | 361/523 |
| 2007/0279841 A1* | 12/2007 | Kim et al. | 361/540 |
| 2007/0285876 A1* | 12/2007 | Takatani et al. | 361/524 |
| 2008/0019081 A1* | 1/2008 | Kim et al. | 361/535 |
| 2008/0062617 A1* | 3/2008 | Edson et al. | 361/529 |
| 2008/0080124 A1* | 4/2008 | Kim et al. | 361/529 |
| 2008/0086859 A1* | 4/2008 | Ito | 29/25.03 |
| 2008/0250621 A1* | 10/2008 | Naito et al. | 29/25.03 |
| 2009/0154065 A1* | 6/2009 | Choi et al. | 361/523 |
| 2009/0154066 A1* | 6/2009 | Choi et al. | 361/523 |
| 2009/0154068 A1* | 6/2009 | Choi et al. | 361/533 |
| 2010/0326239 A1* | 12/2010 | Shi et al. | 75/369 |

FOREIGN PATENT DOCUMENTS

| | | |
|---|---|---|
| JP | B2-04-56445 | 9/1992 |
| JP | B2-3241636 | 10/2001 |

* cited by examiner

SOLID ELECTROLYTIC CAPACITOR AND MANUFACTURING METHOD THEREOF

BACKGROUND OF THE INVENTION

1. Field of the Invention

The present invention relates to a solid electrolytic capacitor using a conductive polymer as a solid electrolyte, and to a method for manufacturing the solid electrolytic capacitor.

2. Description of Related Art

In the wake of digitalization and the trend towards smaller, higher-speed electronic devices, there is a steadily growing demand for small, large-capacitance capacitors having low impedance at high frequencies, also in the field of solid electrolytic capacitors.

Conventional capacitors used in high frequencies ranging from 100 kHz to several tens of MHz include mica capacitors and laminated ceramic capacitors. Such capacitors, however, are large, and can yield substantial capacitances only with difficulty. Meanwhile, electrolytic capacitors such as aluminum electrolytic capacitors or tantalum solid electrolytic capacitors are used as large-capacitance capacitors. However, the electrolytes used in such electrolytic capacitors (an electrolyte solution in aluminum electrolytic capacitors and manganese dioxide in tantalum electrolytic capacitors) have low conductivity. Therefore, it is difficult to obtain capacitors having low enough impedance at high frequencies.

To overcome the above drawbacks, Japanese Examined Patent Application Publication No. H04-56445 discloses an aluminum solid electrolytic capacitor and a tantalum solid electrolytic capacitor that uses, as an electrolyte, a high-conductivity conductive polymer such as polypyrrole or polythiophene. The electrolyte in a solid electrolytic capacitor using such a conductive polymer has high conductivity, thanks to which the solid electrolytic capacitor features low enough impedance at high frequencies.

In such a solid electrolytic capacitor using a conductive polymer on a solid electrolyte layer, a conductive polymer layer peels off a dielectric oxide film, whereby contact resistance increases, when adherence between the dielectric oxide film layer and the conductive polymer layer is poor. This is problematic in that, as a result, good equivalent series resistance (ESR) cannot be obtained.

To solve the problem of adherence between the dielectric oxide film layer and the conductive polymer layer, Japanese Patent No. 3241636 discloses a method of forming a conductive polymer, in which an acrylic resin and/or a cellulose resin is added to a conductive polymer monomer, followed then by a polymerization reaction.

Manufacturing a solid electrolytic capacitor by adding an acrylic resin and/or a cellulose resin to a conductive monomer, in accordance with a conventional technology, has the effect of increasing adherence between the dielectric oxide film layer and the conductive polymer layer vis-a-vis the case where no additive is added. However, it has been found that part of the conductive polymer still peels off and that contact resistance increases.

SUMMARY OF THE INVENTION

In the light of the above, it is an object of the present invention to provide a solid electrolytic capacitor having low enough impedance at high frequencies, and a method for manufacturing the solid electrolytic capacitor, in which the contact resistance between a dielectric oxide film layer and a conductive polymer layer in the solid electrolytic capacitor is reduced.

The characterizing features of the invention that solve the above problems are as follows.

According to an aspect of the present invention, there is provided a solid electrolytic capacitor including: a valve metal; a dielectric oxide film layer formed on a surface of the valve metal; and a solid electrolyte layer, comprising a conductive polymer layer, formed on the dielectric oxide film layer. In the solid electrolytic capacitor, the conductive polymer layer contains, as an additive, an organic oligomer having an average degree of polymerization of 2 to 100 (no less than 2 and no greater than 100), and the content of the additive is 0.1 wt % to 30 wt % (no less than 0.1 wt % and no greater than 30 wt %).

According to one embodiment of the present invention, the additive comprises one or more organic oligomers selected from among polyesters and polyethers.

According to another aspect of the present invention, there is provided a method of manufacturing a solid electrolytic capacitor, including the steps of: forming a dielectric oxide film layer by anodizing a surface of a valve metal; and forming a conductive polymer layer on the dielectric oxide film layer by polymerizing a conductive polymer monomer solution having added thereto, as an additive, 0.1 wt % to 30 wt % (no less than 0.1 wt % and no greater than 30 wt %) of an organic oligomer.

According to one embodiment of the present invention, the additive comprises one or more organic oligomers selected from among polyesters and polyethers.

In the solid electrolytic capacitor having the above characterizing features, the conductive polymer layer contains 0.1 wt % to 30 wt % of a polyester or a polyether, as an additive, having superior compatibility with the conductive polymer and eliciting better adhesion to the dielectric oxide film layer, than an acrylic resin or a cellulose resin. Adherence between the dielectric oxide film layer and the conductive polymer layer becomes especially good in such a solid electrolytic capacitor, in which peeling of the conductive polymer layer off the dielectric oxide film is thus suppressed. As a result there can be obtained a low-impedance solid electrolytic capacitor, having excellent ESR characteristics, in which rises in contact resistance are curbed.

In the present invention, as described above, adherence between the dielectric oxide film layer and the conductive polymer layer is increased by adding to conductive polymer layer 0.1 wt % to 30 wt % of an organic oligomer, as an additive, having an average degree of polymerization of 2 to 100. The invention affords thus the effect of achieving a solid electrolytic capacitor having low enough impedance at high frequencies, as well as a method for manufacturing the solid electrolytic capacitor.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Embodiments to which the present invention is applied are explained hereinafter.

Figure 1:
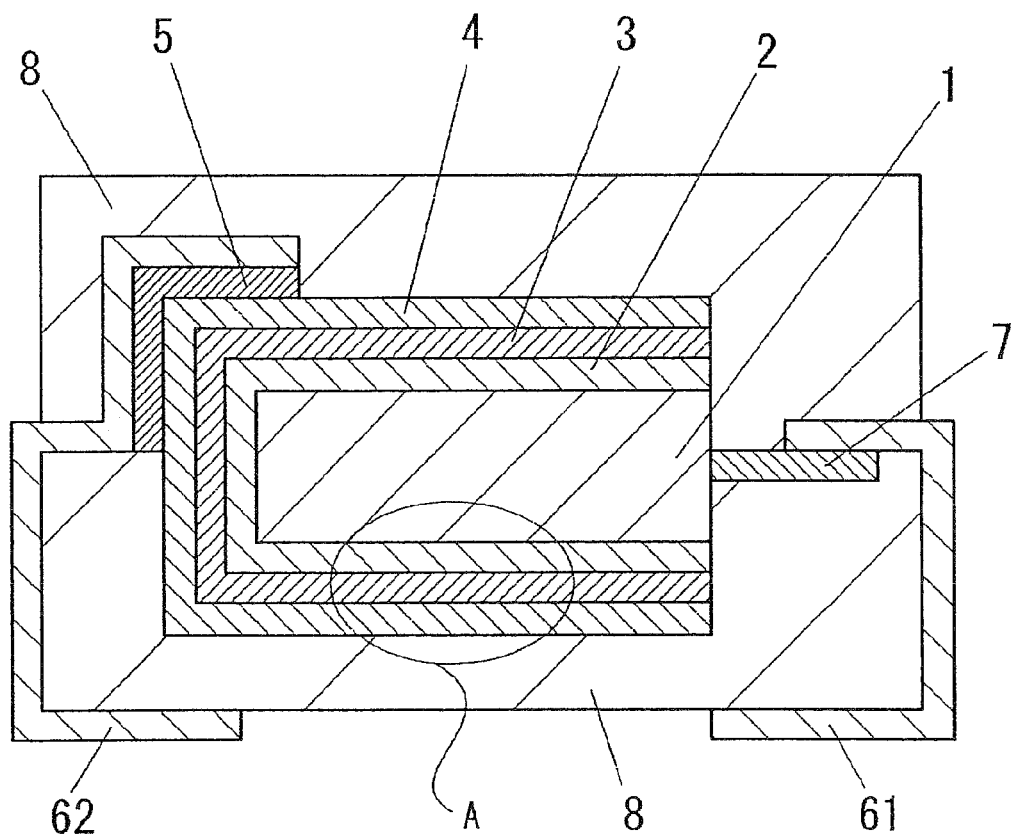
FIG. 1 is a schematic cross-sectional diagram illustrating the structure of a solid electric capacitor according to the present invention.
Figure 2:
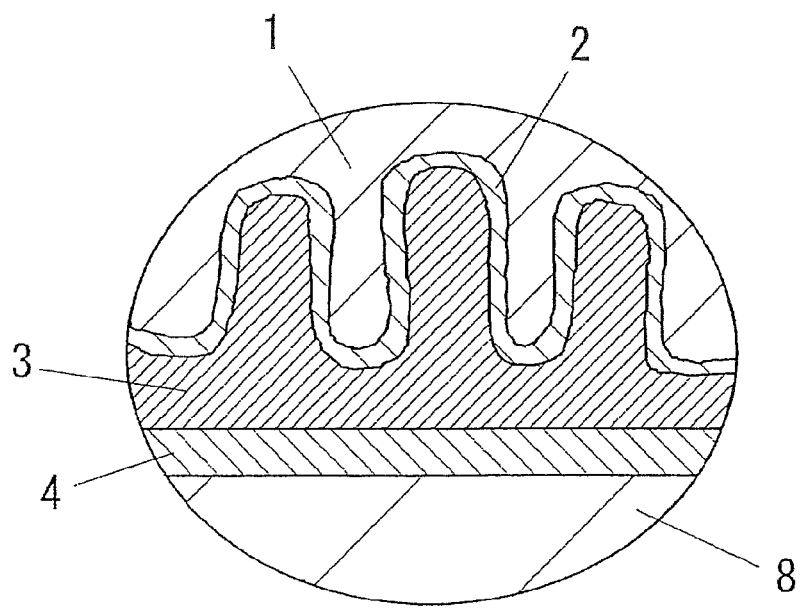
FIG. 2 is a partial enlarged cross-sectional diagram of the solid electric capacitor according to the present invention.

FIG. 1 is a schematic cross-sectional diagram illustrating the structure of a solid electric capacitor according to the present invention. FIG. 2 is a partial enlarged cross-sectional diagram of the vicinity of a dielectric oxide film layer of the solid electrolytic capacitor according to the present invention, corresponding to the region enclosed by line A in FIG. 1.

The build-up of the solid electrolytic capacitor of the present embodiment of the invention is basically identical to that of a conventional solid electrolytic capacitor, except that herein a conductive polymer layer 3, which is a solid electrolyte, contains, as an additive, 0.1 wt % to 30 wt % of an organic oligomer having an average degree of polymerization of 2 to 100. Other than the additive, therefore, known materials, shapes and so forth can be used in the solid electrolytic capacitor, without any particular limitation.

The solid electrolytic capacitor of the present embodiment of the invention is obtained as a result of a step of forming, on a valve metal 1, a dielectric oxide film layer 2 of the metal in the valve metal 1; a step of forming a conductive polymer layer 3 by adding to the dielectric oxide film layer 2, as an additive, 0.1 wt % to 30 wt % of an organic oligomer having an average degree of polymerization of 2 to 100; and a step of forming a cathode layer 4, comprising a conductive paste, on the conductive polymer layer 3.

In particular, the additive is preferably a polyester or a polyether, and may be a mixture thereof.

Examples of the polyester used in the present invention include, for instance, polyethylene terephthalate, poly(trimethylene terephthalate), poly(butylene terephthalate), poly(pentamethylene terephthalate), poly(hexamethylene terephthalate), poly(n-methylene phthalate) (n>6), poly(cyclohexanedimethyl terephthalate), poly(diethylene glycol terephthalate), poly(ethylene phthalate), poly(trimethylene phthalate), poly(butylene phthalate), poly(pentamethylene phthalate), poly(hexamethylene phthalate), poly(n-methylene phthalate) (n>6), poly(cyclohexanedimethyl phthalate), poly(diethylene glycol phthalate), poly(ethylene naphthalate), poly(trimethylene naphthalate), poly(butylene naphthalate), poly(pentamethylene naphthalate), poly(hexamethylene naphthalate), poly(n-methylene naphthalate) (n>6), poly(cyclohexanedimethyl naphthalate), poly(diethylene glycol naphthalate), or an alkyd resin obtained by polymerizing a polyhydric alcohol and a polybasic acid.

Examples of the polyether used in the present invention include, for instance, polyethylene glycol, polyphenylene ethers, polyether ketones, polyether ether ketones and polyether imides.

The term "poly" in the present invention denotes a degree of polymerization of two or higher. The additive of the present invention encompasses also additives in which the molecular chain ends are substituted with hydroxyl groups or the like.

Preferably, an oligomer having an average degree of polymerization of 2 to 100 is used as the additive of the present invention. More preferably, the average degree of polymerization is 2 to 30, and in particular 2 to 10. The content of the additive ranges more preferably from 1 wt % to 25 wt %, in particular from 5 wt % to 20 wt %. The conductive polymer of the present invention is preferably obtained, in particular, by chemical oxidative polymerization, but may also be obtained by another polymerization method such as electro-polymerization. Examples of valve metals that can be suitably used are not limited to the above-described tantalum example, but include, for instance, metals such as aluminum, titanium, niobium and zirconium, as well as alloys of combinations of the foregoing.

EXAMPLES

Suitable examples of the present invention are explained below compared to conventional solid electrolytic capacitors.

Example 1

A cross-sectional diagram of the solid electrolytic capacitor of the present example is identical to that of FIG. 1 explained in the above embodiment. Example 1 will thus be explained with reference to FIG. 1.

As illustrated in FIG. 1, the solid electrolytic capacitor according to the present example comprises a valve metal 1 as an anode-side electrode; a dielectric oxide film layer 2 obtained by anodization of a surface of the valve metal 1; a conductive polymer layer 3 as a solid electrolyte; a cathode layer 4 comprising a conductive paste; an outer electrode 61 of the anode; an outer electrode 62 of the cathode; and a cladding resin 8.

A method for manufacturing the solid electrolytic capacitor is explained with reference to FIG. 1. Firstly there was manufactured a 3.5 mm long, 3.0 mm wide and 1.5 mm thick sintered compact of a tantalum micropowder. The sintered compact was anodized through immersion in a phosphoric acid aqueous solution, under application of a 30 V voltage, to yield pellets in which the entire surface of the sintered compact was covered with a dielectric oxide film layer 2.

The pellets covered with the dielectric oxide film layer 2 were dipped next for 10 minutes in a 20 wt % methanol solution of iron (III) dodecylbenzenesulfonate, which is an oxidizing agent. The pellets were dried for 30 minutes at 60° C., and were then dipped for 10 minutes in pyrrole containing 1 wt % of polyhexamethylene phthalate having an average degree of polymerization of 8. The whole was further kept at room temperature for 30 minutes, to carry out pyrrole polymerization. The conductive polymer layer 3 comprising a conductive polypyrrole layer was formed by repeating five times this series of polymerization operations comprising oxidizing agent treatment and additive-containing pyrrole treatment.

The pellets were washed then with ethanol and dried. Thereafter, a silver paste was coated onto the surface of the conductive polypyrrole layer, followed by heating curing, to form thereby a 10 to 50 µm-thick cathode layer 4.

Thereafter, the cathode layer 4 of the resulting capacitor element was connected to the external electrode 62 using an adhesive layer 5. A valve metal wire 7, drawn beforehand from the tantalum sintered compact, was welded to the external electrode 61, on the anode side of the capacitor element. The exterior of the capacitor element was encapsulated with an epoxy resin to form the cladding resin 8. This completed the solid electrolytic capacitor of Example 1 having the structure illustrated in FIG. 1.

In the present example, polypyrrole was formed as the conductive polymer layer 3, but the same effect can be obtained using a conductive polymer such as polythiophene or polyaniline, or a derivative of such conductive polymers.

Example 2

A capacitor was prepared in accordance with the same method of Example 1, except that now there were added, as the additive, 10 wt % of polyhexamethylene phthalate having an average degree of polymerization of 8.

That is, a dielectric oxide film layer 2 was formed using the same sintered compact of Example 1 and in accordance with the same method of Example 1.

The pellets covered with the dielectric oxide film layer 2 were dipped next for 10 minutes in a 20 wt % methanol solution of iron (III) dodecylbenzenesulfonate, which is an oxidizing agent. The pellets were dried for 30 minutes at 60° C., and were then dipped for 10 minutes in pyrrole containing 10 wt % of polyhexamethylene phthalate having an average degree of polymerization of 8. The whole was further kept at room temperature for 30 minutes, to carry out pyrrole polymerization. The conductive polymer layer 3 comprising a conductive polypyrrole layer was formed by repeating five times this series of polymerization operations comprising oxidizing agent treatment and additive-containing pyrrole treatment.

In the present example, polypyrrole was formed as the conductive polymer layer 3, but the same effect can be obtained using a conductive polymer such as polythiophene or polyaniline, or a derivative of such conductive polymers.

Example 3

A capacitor was prepared in accordance with the same method of Example 1, except that now there were added, as the additive, 10 wt % of polyphenylene ether having an average degree of polymerization of 8.

That is, a dielectric oxide film layer 2 was formed using the same sintered compact of Example 1 and in accordance with the same method of Example 1.

The pellets covered with the dielectric oxide film layer 2 were dipped next for 10 minutes in a 20 wt % methanol solution of iron (III) dodecylbenzenesulfonate, which is an oxidizing agent. The pellets were dried for 30 minutes at 60° C., and were then dipped for 10 minutes in pyrrole containing 10 wt % of polyphenylene ethers phthalate having an average degree of polymerization of 8. The whole was further kept at room temperature for 30 minutes, to carry out pyrrole polymerization. The conductive polymer layer 3 comprising a conductive polypyrrole layer was formed by repeating five times this series of polymerization operations comprising oxidizing agent treatment and additive-containing pyrrole treatment.

In the present example, polypyrrole was formed as the conductive polymer layer 3, but the same effect can be obtained using a conductive polymer such as polythiophene or polyaniline, or a derivative of such conductive polymers.

Example 4

A capacitor was prepared in accordance with the same method of Example 1, except that now there were added, as the additive, 10 wt % of polyhexamethylene phthalate having an average degree of polymerization of 20.

That is, a dielectric oxide film layer 2 was formed using the same sintered compact of Example 1 and in accordance with the same method of Example 1.

The pellets covered with the dielectric oxide film layer 2 were dipped next for 10 minutes in a 20 wt % methanol solution of iron (III) dodecylbenzenesulfonate, which is an oxidizing agent. The pellets were dried for 30 minutes at 60° C., and were then dipped for 10 minutes in pyrrole containing 10 wt % of polyhexamethylene phthalatehaving an average degree of polymerization of 20. The whole was further kept at room temperature for 30 minutes, to carry out pyrrole polymerization. The conductive polymer layer 3 comprising a conductive polypyrrole layer was formed by repeating five times this series of polymerization operations comprising oxidizing agent treatment and additive-containing pyrrole treatment.

In the present example, polypyrrole was formed as the conductive polymer layer 3, but the same effect can be obtained using a conductive polymer such as polythiophene or polyaniline, or a derivative of such conductive polymers.

Example 5

A capacitor was prepared in accordance with the same method of Example 1, except that now there were added, as the additive, 10 wt % of polyhexamethylene phthalate having an average degree of polymerization of 100. A detailed explanation of the example is omitted.

Example 6

A capacitor was prepared in accordance with the same method of Example 1, except that now there were added, as the additive, 0.1 wt % of polyhexamethylene phthalate having an average degree of polymerization of 8. A detailed explanation of the example is omitted.

Example 7

A capacitor was prepared in accordance with the same method of Example 1, except that now there were added, as the additive, 30 wt % of polyhexamethylene phthalate having an average degree of polymerization of 8. A detailed explanation of the example is omitted.

Example 8

A capacitor was prepared in accordance with the same method of Example 1, except that now there were added, as the additive, 5 wt % of polyhexamethylene phthalate having an average degree of polymerization of 2. A detailed explanation of the example is omitted.

Comparative Example 1

A capacitor was prepared in accordance with the same method of Example 1, except that no additive was added to the monomers of the conductive polymer.

Specifically, a dielectric oxide film layer 2 was formed using the same sintered compact of Example 1 and in accordance with the same method of Example 1.

Pellets covered with the dielectric oxide film layer 2 were dipped next for 10 minutes in a 20 wt % methanol solution of iron (III) dodecylbenzenesulfonate, which is an oxidizing agent. The pellets were dried for 30 minutes at 60° C., and were then dipped for 10 minutes in pyrrole. The whole was further kept at room temperature for 30 minutes, to carry out pyrrole polymerization. The conductive polymer layer 3 comprising a conductive polypyrrole layer was formed by repeating five times this series of polymerization operations comprising oxidizing agent treatment and pyrrole treatment.

Comparative Example 2

A capacitor was prepared in accordance with the same method of Example 1, except that now there was added, as the additive, 1 wt % of an acrylic resin.

Specifically, a dielectric oxide film layer 2 was formed using the same sintered compact of Example 1 and in accordance with the same method of Example 1.

Pellets covered with the dielectric oxide film layer 2 were dipped next for 10 minutes in a 20 wt % methanol solution of iron (III) dodecylbenzenesulfonate, which is an oxidizing agent. The pellets were dried for 30 minutes at 60° C., and were then dipped for 10 minutes in pyrrole comprising 1 wt % of an acrylic resin. The whole was further kept at room temperature for 30 minutes, to carry out pyrrole polymerization. The conductive polymer layer 3 comprising a conductive polypyrrole layer was formed by repeating five times this series of polymerization operations comprising oxidizing agent treatment and additive-containing pyrrole treatment.

The electrostatic capacitance (120 Hz), tan δ (120 Hz) and ESR characteristics (100 kHz) of the solid electrolytic capacitors of Examples 1 to 8 and Comparative examples 1 to 2 are given in Table 1. There were used 20 samples for each criterion, and the characteristic values were calculated as the average for these samples.

is a polyether, and which have superior compatibility with the conductive polymer and eliciting better adhesion to the dielectric oxide film layer 2, than an acrylic resin. These additives increase adherence between the dielectric oxide film layer 2 and the conductive polymer layer 3, as compared with the acrylic resin of Comparative example 2, and afford a solid electrolytic capacitor having low ESR. In Examples 2 and 3, where an additive having an average degree of polymerization of 8 is added in an amount of 10 wt %, the molecules of the additive are small, and hence do not encumber conductive paths in the conductive polymer. As a result, the tan δ and ESR characteristics can be kept at low values, and thus there is achieved a solid electrolytic capacitor suffering no drop in electrostatic capacitance.

TABLE 1

| | Electrostatic capacitance (µF) [120 Hz] | tanδ (%) [120 Hz] | ESR (mΩ) [100 kHz] | Additive | Addition amount (wt %) | Average degree of polymerization |
|---|---|---|---|---|---|---|
| Example 1 | 67.3 | 1.7 | 75 | PHMP | 1 | 8 |
| Example 2 | 67.4 | 1.4 | 62 | PHMP | 10 | 8 |
| Example 3 | 66.9 | 1.5 | 74 | Polyphenylene ether | 10 | 8 |
| Example 4 | 65 | 1.7 | 76 | PHMP | 10 | 20 |
| Example 5 | 63.9 | 1.8 | 80 | PHMP | 10 | 100 |
| Example 6 | 67.8 | 2.2 | 88 | PHMP | 0.1 | 8 |
| Example 7 | 63.1 | 2.1 | 94 | PHMP | 30 | 8 |
| Example 8 | 67.5 | 1.8 | 72 | PHMP | 5 | 2 |
| Comp. example 1 | 67.7 | 2.3 | 98 | — | — | — |
| Comp. example 2 | 62.4 | 1.8 | 83 | Acrylic resin | 1 | — |

Note:
polyhexamethylene phthalate is abbreviated to PHMP

The results for the solid electrolytic capacitors of Examples 1 to 4 and Comparative examples 1 to 2 are evaluated with reference to Table 1.

The solid electrolytic capacitors of Examples 1 to 4, in which there was added polyhexamethylene phthalate, which is a polyester, or polyphenylene ether, which is a polyether, exhibit better tan δ and ESR characteristics than Comparative example 1, in which no additive is added, and Comparative example 2, in which an acrylic resin is added. The numerical values of the characteristics were made lower, in particular, in Examples 1 to 3, where polyhexamethylene phthalate or polyphenylene ether having an average degree of polymerization of 8 was added. In Examples 2 and 3, the value of electrostatic capacitance remains substantially unchanged vis-a-vis that of Comparative example 1, despite the addition of 10 wt % of an additive that is an insulator.

Adherence between layers is poor in a solid electrolytic capacitor using a conductive polymer as a solid electrolyte layer, since the conductive polymer layer 3, which is an organic material, is stacked on the dielectric oxide film layer 2, which is an inorganic material. Poor adherence causes the conductive polymer layer 3 to peel off the dielectric oxide film layer 2, increasing thereby contact resistance. This precludes achieving as a result good ESR. To address this problem, there is added an additive for increasing the adherence between the conductive polymer layer 3 and the dielectric oxide film layer 2. Doing so suppresses peeling of the conductive polymer layer 3 off the dielectric oxide film layer 2, thereby precluding contact resistance rises. A solid electrolytic capacitor is obtained as a result that boasts low impedance at high frequencies.

The additive used in Examples 1 to 4 is polyhexamethylene phthalate, which is a polyester, or polyphenylene ether, which Characteristic in Examples 5 to 8 are compared next vis-a-vis those of Comparative examples 1 to 2.

Example 5 afforded an ESR reduction effect similar to that of Comparative example 2 in comparison with that of Comparative example 1. Example 5 exhibited a smaller electrostatic capacitance drop than Comparative example 2.

Example 6 shows improved tan δ and ESR characteristics vis-a-vis Comparative example 1, and similar electrostatic capacitance. The drop in electrostatic capacitance observed in Comparative example 2 was not observed in Example 6.

Example 7 shows improved tan δ and ESR characteristics vis-a-vis Comparative example 1. Example 7 exhibited a smaller electrostatic capacitance drop than Comparative example 2.

Example 8 shows improved tan δ and ESR characteristics vis-a-vis Comparative example 1. ESR characteristics were improved, while the drop in electrostatic capacitance observed in Comparative example 2 was not observed in Example 8.

In an explanation of the above results focusing on ESR, it transpires that the effect afforded by the additive is observed when the latter is added in an amount of 0.1 wt %, with the ESR diminishing further as the addition amount increases to 1 wt %, 5 wt %, 10 wt %. The effect can be observed even at 30 wt %.

As explained thus far, a solid electrolytic capacitor having excellent impedance characteristics at high frequencies, and in which electrostatic capacitance is preserved, can be obtained by adding 0.1 wt % to 30 wt % of an organic oligomer having an average degree of polymerization of 2 to 100, as an additive, to a conductive polymer layer.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A solid electrolytic capacitor, comprising:
a valve metal;
a dielectric oxide film layer formed on a surface of the valve metal; and
a solid electrolyte layer, comprising a conductive polymer layer, formed on the dielectric oxide film layer, wherein
the conductive polymer layer comprises a layer containing a conductive polymer and a dopant that exhibit conductivity, and an additive that is an insulator,
the dopant comprises an oxidizing agent, and
the additive comprises one or more organic oligomers selected from among polyesters and polyethers, the organic oligomer having an average degree of polymerization of 2 to 100, and the content of the additive being 0.1 wt % to 30 wt %.

2. The solid electrolytic capacitor according to claim 1, wherein the additive comprises one or more organic oligomers selected from among polyethylene terephthalate, poly(trimethylene terephthalate), poly(butylene terephthalate), poly(pentamethylene terephthalate), poly(hexamethylene terephthalate), poly(n-methylene phthalate) (n>6), poly(cyclohexanedimethyl terephthalate), poly(diethylene glycol terephthalate), poly(ethylene phthalate), poly(trimethylene phthalate), poly(butylene phthalate), poly(pentamethylene phthalate), poly(hexamethylene phthalate), poly(cyclohexanedimethyl phthalate), poly(diethylene glycol phthalate), poly(ethylene naphthalate), poly(trimethylene naphthalate), poly(butylene naphthalate), poly(pentamethylene naphthalate), poly(hexamethylene naphthalate), poly(n-methylene naphthalate) (n>6), poly(cyclohexanedimethyl naphthalate), poly(diethylene glycol naphthalate), polyethylene glycol, polyphenylene ethers, polyether ketones, polyether ether ketones and polyether imides.

3. The solid electrolytic capacitor according to claim 1, wherein the conductive polymer comprises a substance selected from among polypyrrole, polythiophene, polyaniline, and derivatives of these conductive polymers.

4. A method for manufacturing a solid electrolytic capacitor, comprising the steps of:
forming a dielectric oxide film layer by anodizing a surface of a valve metal; and
forming a conductive polymer layer on the dielectric oxide film layer, wherein
the conductive polymer layer comprises a layer containing a conductive polymer and dopant that exhibit conductivity, and an additive that is an insulator,
the conductive polymer layer is obtained by polymerizing a conductive polymer monomer solution, and
the additive comprises one or more organic oligomers selected from among polyesters and polyethers, the organic oligomer having an average degree of polymerization of 2 to 100, and the amount of the additive being 0.1 wt % to 30 wt %.

5. The method for manufacturing a solid electrolytic capacitor according to claim 4, wherein the additive comprises one or more organic oligomers selected from among polyethylene terephthalate, poly(trimethylene terephthalate), poly(butylene terephthalate), poly(pentamethylene terephthalate), poly(hexamethylene terephthalate), poly(n-methylene phthalate) (n>6), poly(cyclohexanedimethyl terephthalate), poly(diethylene glycol terephthalate), poly(ethylene phthalate), poly(trimethylene phthalate), poly(butylene phthalate), poly(pentamethylene phthalate), poly(hexamethylene phthalate), poly(cyclohexanedimethyl phthalate), poly(diethylene glycol phthalate), poly(ethylene naphthalate), poly(trimethylene naphthalate), poly(butylene naphthalate), poly(pentamethylene naphthalate), poly(hexamethylene naphthalate), poly(n-methylene naphthalate) (n>6), poly(cyclohexanedimethyl naphthalate), poly(diethylene glycol naphthalate), polyethylene glycol, polyphenylene ethers, polyether ketones, polyether ether ketones and polyether imides.

6. The method for manufacturing a solid electrolytic capacitor according to claim 4, wherein the conductive polymer comprises a substance selected from among polypyrrole, polythiophene, polyaniline, and derivatives of these conductive polymers.

* * * * *